(12) United States Patent
Marquié

(10) Patent No.: US 12,223,368 B2
(45) Date of Patent: Feb. 11, 2025

(54) EXPOSING STANDARDIZED EVENTS WITHIN AN API PROXY SYSTEM

(71) Applicant: Citrix Systems, Inc., Fort Lauderdale, FL (US)

(72) Inventor: Bruno Marquié, Lans-en-Vercors (FR)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/860,729

(22) Filed: Jul. 8, 2022

(65) Prior Publication Data
US 2024/0012696 A1 Jan. 11, 2024

(51) Int. Cl.
G06F 9/54 (2006.01)

(52) U.S. Cl.
CPC .............. G06F 9/542 (2013.01); G06F 9/547 (2013.01)

(58) Field of Classification Search
CPC ................................. G06F 9/542; G06F 9/547
See application file for complete search history.

(56) References Cited

U.S. PATENT DOCUMENTS

| | | | |
|---|---|---|---|
| 9,977,703 B2 * | 5/2018 | Gall | G06F 9/542 |
| 10,642,585 B1 | 5/2020 | Srivastava | |
| 11,012,400 B1 | 5/2021 | Xu | |
| 11,409,835 B1 * | 8/2022 | Felt | G06F 9/00 |
| 2017/0064038 A1 * | 3/2017 | Chen | H04W 12/08 |
| 2019/0208250 A1 * | 7/2019 | Karp | H04L 67/1097 |
| 2019/0260844 A1 * | 8/2019 | Wagenknecht | H04L 67/141 |
| 2020/0272670 A1 * | 8/2020 | Vaishnavi | G06F 9/541 |
| 2020/0342449 A1 * | 10/2020 | Lai | G06F 16/2379 |
| 2021/0218846 A1 * | 7/2021 | Lawson | H04M 3/2209 |
| 2022/0405153 A1 * | 12/2022 | Xu | H04W 24/02 |
| 2023/0123860 A1 * | 4/2023 | Marquie | G06F 16/24575 |
| | | | 719/328 |

FOREIGN PATENT DOCUMENTS

AU 2020356802 A1 10/2021

OTHER PUBLICATIONS

Extended European Search Report to Application No. 23182923.5 dated Aug. 8, 2023.

* cited by examiner

Primary Examiner — Brian W Wathen

(57) ABSTRACT

In one disclosed embodiment, a computing system may receive, at a first application programming interface (API) endpoint, a first request for a first operation. The computing system may send, to a second API endpoint, a first API call requesting the first operation. In response to sending the first API call, the computing system may receive a first response to the first API call. The computing system may determine that at least one characteristic of the first request or the first response satisfies a criterion. The computing system may detect a first event based on the first request or the first response satisfying the criterion. The computing system may generate a first indication of the first event.

15 Claims, 13 Drawing Sheets

EXPOSING STANDARDIZED EVENTS WITHIN AN API PROXY SYSTEM

BACKGROUND

Various systems have been developed that allow client devices to access applications and/or data files over a network. Certain products offered by Citrix Systems, Inc., of Fort Lauderdale, FL, including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises receiving, at a first application programming interface (API) endpoint of a first computing system, a first request for a first operation; sending, from the first computing system to a second API endpoint, a first API call requesting the first operation; in response to sending the first API call, receiving a first response to the first API call; determining, by the first computing system, that at least one characteristic of the first request or the first response satisfies a criterion; detecting, by the first computing system, a first event based on the first request or the first response satisfying the criterion; and generating, by the first computing system, a first indication of the first event.

In some embodiments, a computing system comprises at least one processor and at least one computer-readable medium encoded with instructions which, when executed by the at least one processor, cause the computing system to receive, at a first application programming interface (API) endpoint, a first request for a first operation, to send, to a second API endpoint, a first API call requesting the first operation, in response to sending the first API call, to receive a first response to the first API call, to determine that at least one characteristic of the first request or the first response satisfies a criterion, to detect a first event based on the first request or the first response satisfying the criterion, and to generate a first indication of the first event.

In some embodiments, at least one non-transitory computer-readable medium may be encoded with instructions which, when executed by at least one processor of a computing system, cause the computing system to receive, at a first application programming interface (API) endpoint, a first request for a first operation, to send, to a second API endpoint, a first API call requesting the first operation, in response to sending the first API call, to receive a first response to the first API call, to determine that at least one characteristic of the first request or the first response satisfies a criterion, to detect a first event based on the first request or the first response satisfying the criterion, and to generate a first indication of the first event.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
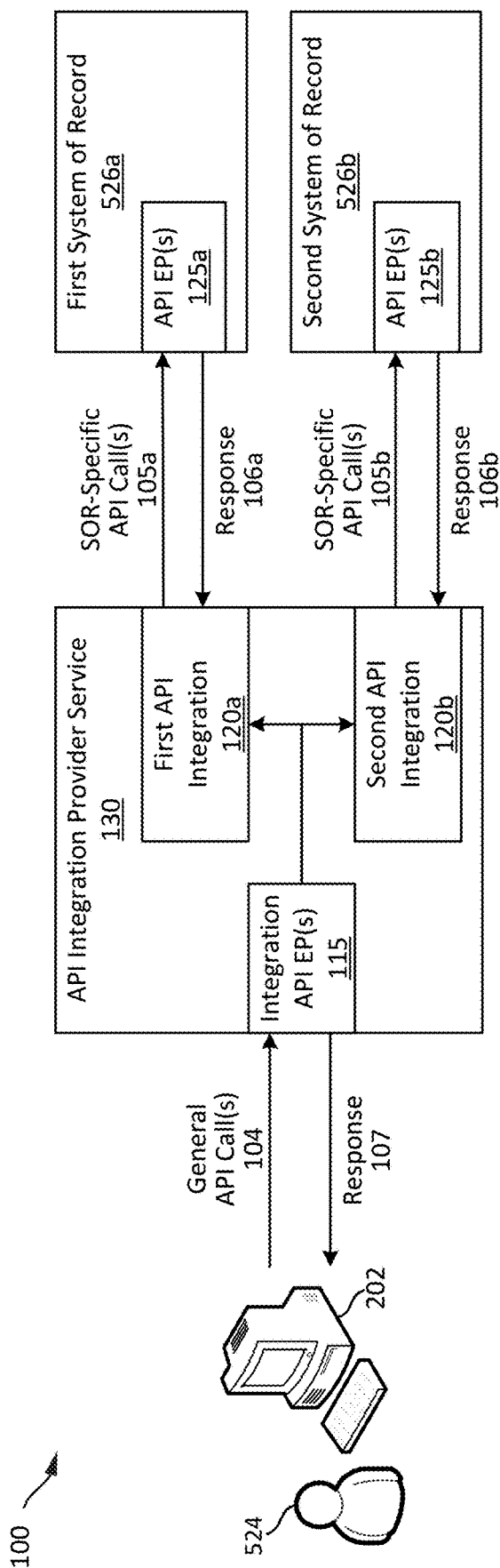
FIG. 1A is a diagram illustrating example operations of a system for facilitating access to application programming interface (API) integrations in accordance with the present disclosure.

For purposes of reading the description of the various embodiments below, the following descriptions of the sections of the specification and their respective contents may be helpful:

Section A provides an introduction to example embodiments of a system for exposing standardized events within an API proxy system in accordance with some aspects of the present disclosure;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the system introduced in Section A; and Section G describes example implementations of methods, systems/devices, and computer-readable media in accordance with the present disclosure.

A. Introduction to Illustrative Embodiments of a System for Exposing Standardized Events Within an API Proxy System Service providers may develop integrations to interact with systems of record for various purposes. For example, as described below in Section E, a multi-resource access system 500 may include a microapp service 528 (shown in FIG. 5C) that can access resources of systems of record (SORs) 526 on behalf of clients 202. In such a system, interaction between clients 202 and SORs 526 is indirect, with clients 202 interfacing with microapps (implemented by a microapp service 528), and such microapps interacting with SORs 526 via a data integration provider service 530.

As described in U.S. patent application Ser. No. 17/505,065 ("the '065 Application"), filed Oct. 19, 2021, and entitled "Facilitating Access to API Integrations," the entire contents of which is incorporated herein by reference, the data integration provider service 530 (shown in FIG. 5C) may be implemented as an API integration provider service that is configured to not only host API integrations for various SORs 526, but also make those API integrations directly accessible to clients 202 or other services via integration API endpoints (EPs). A high-level depiction of a system 100 that includes such an API integration provider service 130 is shown in FIG. 1A. As shown, in the illustrated system 100, a client 202 may send an API call 104 to an integration API EP 115 and, in response to that API call 104, an API integration provider service 130 may invoke one or more API integrations 120 to interact with one or more SORs 526 in a manner defined by such integration(s). Such API integration(s) 120 may, for example, include respective scripts or other executable files that may execute processes to generate and send one or more API calls 105 to one or more SOR API EPs 125 based on the API call 104 received from the client 202. Such API integration(s) 120 may also receive one or more responses 106 from the SOR API EP(s) 125. In some cases, an API integration 120 may translate data in the API call 104 received from the client 202 to match an input schema of a particular SOR API EP 125, and may translate data in SOR response(s) 106 to conform to a standard output schema. The API integration provider service 130 may thus provide one or more integration API EPs 115 that the client 202 may use to access functionality of various SORs 526 using API calls 104 having a consistent format. In some cases, the API integration provider service 130 may send the API call(s) to the SOR API EP(s) 125 via an HTTP proxy service, which may retrieve client credentials to authenticate the API call(s) on behalf of the client 202 before forwarding the API call(s) to the SOR API EP(s) 125, thus allowing an SOR 526 to provide a response based on information associated with a client profile or account.

In the example system 100 shown in FIG. 1A, the API integration provider service 130 hosts at least a first API integration 120a and a second API integration 120b (collectively, API integrations 120), and exposes those API integrations 120 to the client 202 via one or more integration API EPs 115. The API integration provider service 130 may be provided by one or more servers or other computing systems accessible to one or more client devices 202 and/or client applications. Examples of servers 204, a cloud computing environment 400, and/or a cloud computing environment 512, etc., that may be used to implement the API integration provider service 130 are described below in Sections B through E. Although illustrated as a computer operated by a user 524, it should be appreciated that the client 202 may take on any of numerous other forms and need not be user-operated. Several example of clients 202 that may interact with the API integration provider service 130 via the integration API EP(s) 115 are also described below in Sections B through E.

The API integration provider service 130 may be local to the client 202 (e.g., on the same local area network) or may be implemented by one or more remove servers 204 (examples of which are described below). The client 202 may communicate with the API integration provider service 130 over one or more computer networks 206 (examples of which are described below). The API integration provider service 130 may communicate with the SORs 526 over the same or other computer networks. As noted above, the client 202 may access the API integration provider service 130 via the integration API EP(s) 115, and the API integration provider service 130 may access the SORs 526 via the SOR API EP(s) 125.

The API integration provider service 130 may receive one or more general API calls 104 from the client 202 at one or more integration API EPs 115. The integration API EP 115 may have standardized input/output schemas; for example, that may be independent of input/output schemas used by the SOR API EPs 125. Thus, a client 202 may make API calls in the standardized format independent of which SOR 526 is ultimately accessed. In response to such general API call(s) 104, the first API integration 120a may execute the first process and/or the second API integration 120b may execute the second process. The API integrations 120 may execute processes to translate or otherwise reformat data from the general API call 104 into a format used by the SOR API EPs 125. Thus, the first API integration 120a may execute a first process during which it makes one or more SOR-specific API calls 105a to one or more SOR API EPs 125a hosted by the first SOR 526a. The second API integration 120b may execute a second process during which it makes one or more SOR-specific API calls 105b to one or more SOR API EPs 125b hosted by the second SOR 526b. As part of the first and/or second processes, the API integration(s) 120 may receive and process response(s) 106 from the system(s) of record 526, and may send one or more responses 107 to the client 202 via the integration API EP(s) 115 that received the general API call(s) 104 from the client 202. In some implementations, the first and/or second processes may translate data in the general API call 104 to match API EP input schema(s) of the SOR API EP(s) 125. The first and/or second processes employed by the API integrations 120 may additionally translate data in the SOR response(s) 106 to match an API EP output schema of the integration API EP 115 to which the client 202 sent the general API call 104.

Although not illustrated in FIG. 1A, it should be appreciated that, in some implementations, the API integration provider service 130, or perhaps a separate service, may additionally provide an integration "discovery" service to client devices 202. For instance, individual API integrations 120 that are hosted by the service 130 may be assigned one or more type identifiers, and a client device 202 may send a query to the discovery service to identify the API integrations 120 of a particular type to which the client device 202 has access rights. For example, an application on the client device 202 (e.g., the resource access application 522 describe in Section E) may query the discovery service for the API integrations 120 of a type "search" to which the client device 202 has access rights. In response to such a query, the discovery service may return a list of accessible API integrations 120, as well as corresponding URLs of the integration API EPs 115 for the respective integrations. The requesting application may then be responsible for selecting, either automatically or at the direction of a user 524, some or all of the identified integrations 120 to which a general API call 104 is to be sent, as well as for sending those general API calls 104 to the integration API EPs 115 of the selected integrations and processing the returned responses 107 from those integration API EPs 115. Such a discovery service is described in the '065 Application, incorporated by reference above.

In some embodiments, the API integration provider service 130 may enable different services to join the multi-resource access system 500 by implementing on-demand standardized representational state transfer (REST) APIs. Functions provided by an SOR 526 may include file creation, file deletion, file copying or moving, file upload, file download, file editing, and a file search. The API integration provider service 130 of a multi-resource access system 500 may provide a universal or standardized API input schema for the different SORs 526. For example, the API input schema to create a file may be implemented the same for both Sharefile and OneDrive, with the API input schema including a parameter identifying the intended SOR 526 (e.g., Sharefile or OneDrive). The standardized domain APIs (e.g., API integrations 120) may enable any client application to be built independently of any one SOR 526.

In an intelligent workspace environment such as the multi-resource access system 500, in which the multi-resource access system 500 may be accessed by different users 524 and client devices 202, some files and information may be sensitive or restricted. Thus, providing a notification or alert routine when actions occur for certain files or directories may be valuable to users. However, a notification system of one SOR 526 may be unique from other SORs 526, and in some instances an SOR 526 may not offer a notification system. This may require a user to set up notifications, if available, for every respective SOR 526 of the workspace. Further, based on the nature of the multi-resource access system 500 and the use of the intermediary API integration provider service 130, a SOR 526 may not have a direct connection or association with a client device 202 and thus preventing the SOR 526 from providing direct event notification to a user 524 or associated client 202. Additionally, when a new SOR 526 is added, it may be undesirable or error prone to setup a new notification system for the new SOR 526, leading to possible missed notifications. Another option might be to set up a client side notification system, but a client application that leverages the described API integrations 120 may have to utilize a polling approach, and thus losing the any real-time or on-demand event notification performance.

A universal or SOR agnostic event identification system may be a valuable resource for users of the multi-resource access system 500. In some implementations, such a system may include an event subscription component that enables both continuous identification of events and may use to its advantage the standardized input/output schemas of the API integrations 120 to provide uninterrupted event identification as different SORs 526 are added and removed from the API integration provider service 130. Additionally, the standardized input/output schemas may enable push event and push notification functionality and thus provide real time notifications to a user. Offered are systems and techniques to automatically map and generate events for certain file operations (i.e., create, update, delete, search, etc.), and/or other pre-defined events in the multi-resource access system 500. Further, these systems and techniques may include subscription capabilities and event monitoring for third party users and services.

Figure 1B:
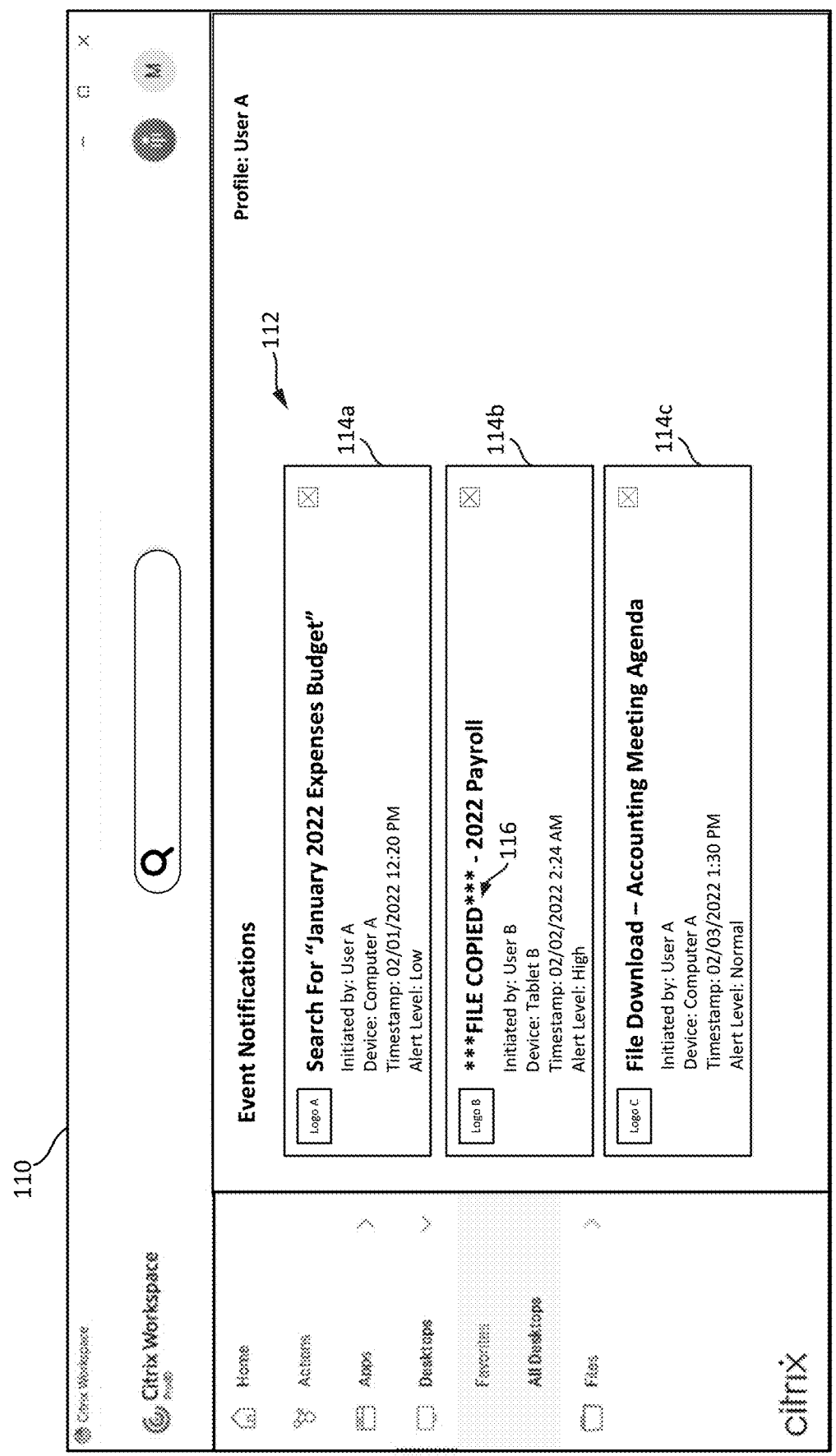
FIG. 1B is a diagram illustrating an example application view of event notifications, in accordance with the present disclosure.

FIG. 1B illustrates an example application view 110 of event notifications 114, in accordance with some embodiments. In some implementations, the application view 110 may be a graphical user interface (GUI) provided by an intelligent workspace platform such as Citrix Workspace™. For instance, in some implementations, the application view 110 may be generated by the resource access application 522 shown in FIGS. 5B and 5C. As shown in FIG. 1B, the application view 110 may provide a notification feed 112 including notifications 114a, 114b, 114c. In some implementations, the notification feed 112 may include notifications related to events initiated by the user (e.g., User A), such as notifications 114a, 114c. In some implementations, the notification feed may additionally or alternatively include notifications for events initiated by other users (e.g., User B), such as notification 114b. In some implementations, the notifications 114 may include indicators 116 of alert levels to highlight types of notifications that a user may have identified as high priority or critical. For example, the user (e.g., User A) may have determined that the "2022 Payroll" file contains sensitive information and, for that reason, may have requested in the notification subscription to receive a "high-priority" alert notification if another user (e.g., User B) accesses or copies the file.

Figure 1C:
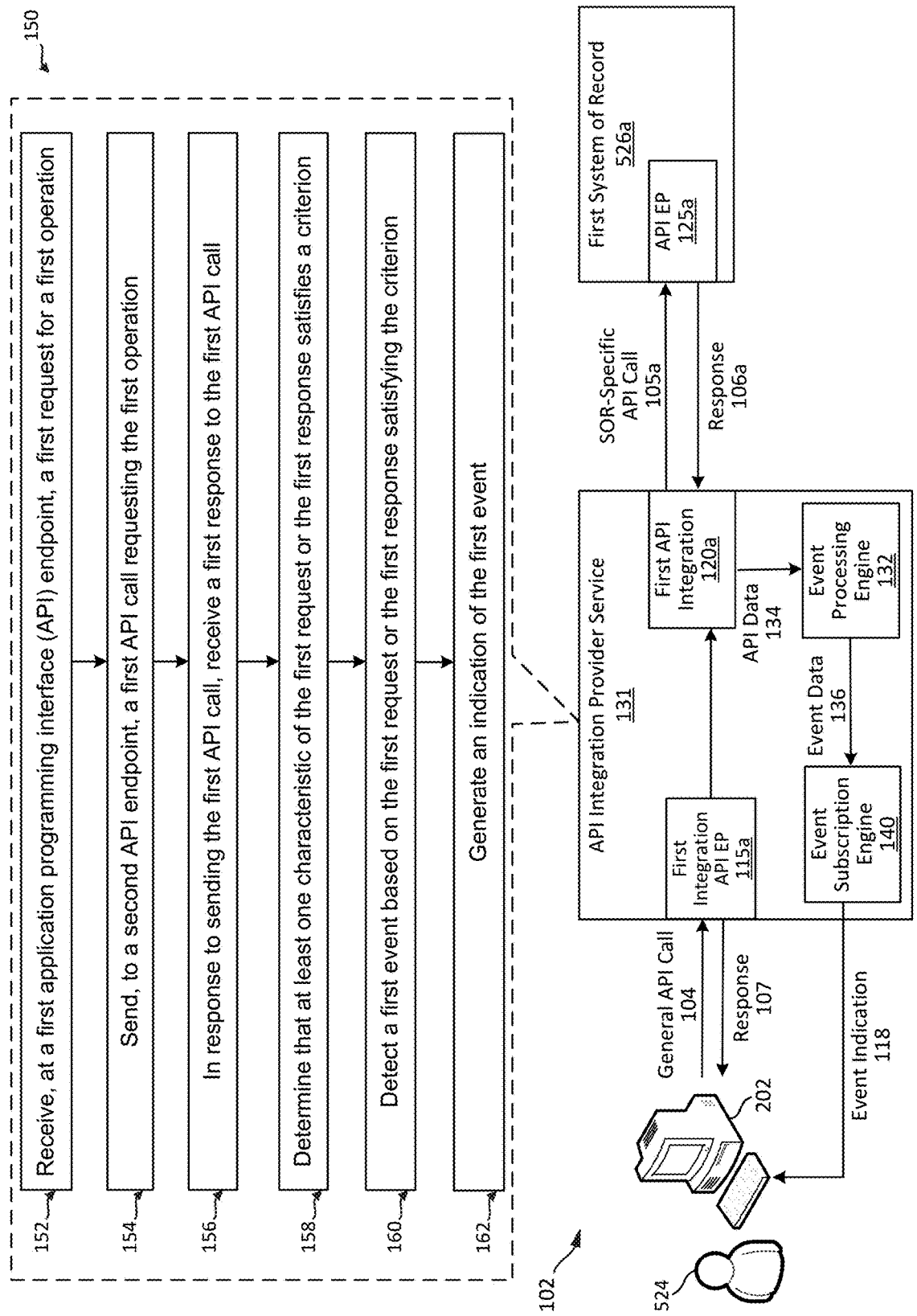
FIG. 1C is a diagram illustrating example operations of a system for exposing standardized events within an API proxy system in accordance with some aspects of the present disclosure.

FIG. 1C is a diagram illustrating example operations of a system 102 for identifying standardized domain events and providing indications 118 of identified events (e.g., notifications 114) in accordance with some aspects of the present disclosure. As shown, the system 102 is similar to the system 100 (shown in FIG. 1A) in many respects. In the system 102, however, the API integration provider service 131 additionally includes an event processing engine 132 and an event subscription engine 140. The functionality of the API integration provider service 131 may otherwise be identical to that of the integration provider service 130 described above. As explained below, the event processing engine 132 may facilitate standardized event identification based on one or more criteria, e.g., corresponding to parameters of an event notification subscription, to enable some of the novel functionality described herein. Additionally, as explained further below in connection with FIG. 6, in some implementations, the event processing engine 132 may interface with the event subscription engine 140 and a database 604 (not shown in FIG. 1C) that stores event subscription data.

FIG. 1C further shows an example routine 150 that may be performed by an API integration provider service 131 that has been enhanced with an event processing engine 132. As shown in FIG. 1C, at a step 152 of the routine 150, the API integration provider service 131 may receive a request for an operation by a system of record (e.g., the SOR 526*a*). Such a request may, for example, be a general API call 104 that the API integration provider service 131 receives at the first integration API EP 115*a*.

As described above, in some implementations, the first API integration 120*a* may be configured to receive, at the first integration API EP 115*a*, incoming general API calls 104. The first API integration 120*a* may be configured to translate such general API calls 104 into one or more SOR-specific API calls 105*a*, and to send such SOR-specific API call(s) 105*a* to one or more API endpoints (e.g., API EP 125*a*) of a system of record (e.g., the SOR 526*a*). As shown in FIG. 1C, at a step 154 of the routine 150, the API integration provider service 131 may send, to an API endpoint (e.g., the API EP 125*a*) of the system of record (e.g., the SOR 526*a*), an API call (e.g., an SOR-specific API call 105*a*) requesting the operation.

At a step 156 of the routine 150, the API integration provider service 131 may receive, in response to sending the API call (e.g., an SOR-specific API call 105*a*) requesting the operation, a response (e.g., a response 106*a*) to the API call. As described above, in some implementations, the first API integration 120*a* may further be configured to receive, from the SOR 526*a*, one or more responses 106*a* to SOR-specific API call(s) 105*a* and to translate such response(s) 106 into an outgoing response 107 representing a result from the operation performed by the system of record (e.g., the SOR 526*a*). In some implementations, the first API integration 120*a* may be configured to send the outgoing response 107 to the component that sent the incoming general API call 104.

As illustrated in FIG. 1C, in some implementations, the first API integration 120*a* may further be configured to send API data 134 to the event processing engine 132 of the API integration provider service 131. The event processing engine 132 may be configured to evaluate the received API data 134 to determine whether characteristics of the one or more received requests (e.g., the general API call(s) 104) or one or more responses received from SORs 526 (e.g., response(s) 106*a*) satisfy one or more criteria.

At step 158 of the routine 150, the API integration provider service 131 may determine (e.g., based on the event processing engine 132 evaluating the API data 134) that at least one characteristic of the request (e.g., the general API call 104) or the response (e.g., the response 106*a*) satisfies a criterion. In some implementations, the criterion may be based on event parameters defining an event subscription. For example, as described below in reference to FIGS. 6 and 7, a user 524 may create an event subscription by defining one or more event parameters. In some implementations, the request (e.g., the general API call 104) or the response (e.g., the response 106*a*) may include one or more characteristics, such as an operation type, that correspond to one or more of such defined event parameters. For example, the request (e.g., the general API call 104) may be for a file deletion operation, and an event subscription may be defined to include at least one event parameter for an operation type corresponding to file deletion operations. In such a circumstance, the event processing engine 132 may determine that the request (e.g., the general API call 104) has a characteristic (e.g., file deletion operation) that satisfies the event parameter, or criterion.

At step 160 of the routine 150, the API integration provider service 131 may detect an event based on the request (e.g., the general API call 104) or the response (e.g., the response 106*a*) satisfying the criterion. As shown in FIG. 1C, in some implementations, upon detecting such an event, the event processing engine 132 may send event data 136 to the event subscription engine 140.

At step 162 of the routine 150, the API integration provider service 131 may generate an indication 118 of the event. For example, as shown in FIG. 1C, the event subscription engine 140 may generate an event indication 118 based on the event data 136 received from the event processing engine 132. The event indication 118 may, for example, be an email sent to the client 202 or displayed as a feed item (e.g., as one of the event notifications 114*a*, 114*b*, 114*c* in the notification feed 112 shown in FIG. 1B). As shown in FIG. 1C, in some implementations, the event subscription engine 140 may send the event indication 118 to the client 202. In other implementations, the event indication 118 may take on other forms and/or may be communicated to recipients in other ways. For example, as described in more detail below, in some implementations, event indications 118 may simply be a representation of an event (e.g., using a markup language or otherwise) that is sent to a service that has subscribed to receive event indications 118 and/or notifications 114 of particular types of events.

In some implementations, as shown in FIG. 1C, the API integration provider service 131 may additionally send the event indication 118 to a subscriber (e.g., the client device 202, a reporting service, etc.). In some implementations, the event indication 118 may be sent to a computing system (e.g., the client 202) that initiated the request (e.g., the general API call 104) for the operation by the SOR 526 (per the step 154). In some implementations, the event indication 118 may additionally or alternatively be sent to a computing system separate from the computing system (e.g., the client 202) that initiated the request (e.g., the general API call 104). For example, a user or a service may wish to be alerted whenever certain operations are requested, such as a file deletion.

The API integration provider service 131 may enable event tracking, and possibly also and notification generation, that is agnostic of any specific SOR 526. This functionality is made possible, at least in part, by evaluating the content of API requests and responses, such as in the system 102 shown in FIG. 1C, that pass through the API integration provider service 131, rather than relying on the receipt of notifications from individual SORs 526. The methods and techniques described herein thus enables the real-time pushing of indications 118 of events (e.g., notifications 114, telemetry data, etc.) to clients 202, reporting services, etc., in a manner not previously possible.

B. Network Environment

Figure 2:
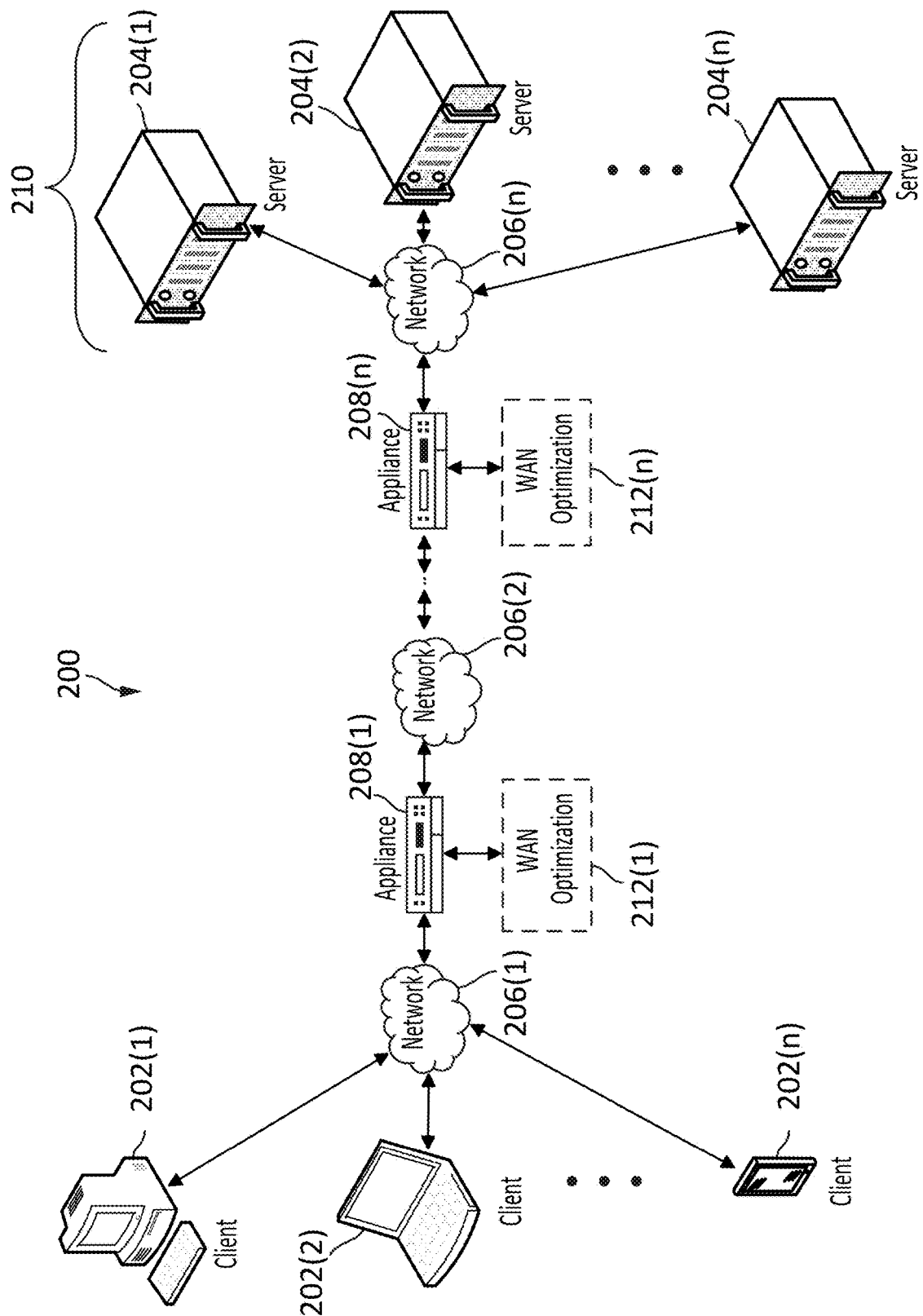
FIG. 2 is a diagram of a network environment in which some embodiments of the present disclosure may be deployed.

Referring to FIG. 2, an illustrative network environment 200 is depicted. As shown, the network environment 200 may include one or more clients 202(1)-202(*n*) (also generally referred to as local machine(s) 202 or client(s) 202) in communication with one or more servers 204(1)-204(*n*) (also generally referred to as remote machine(s) 204 or server(s) 204) via one or more networks 206(1)-206(*n*) (generally referred to as network(s) 206). In some embodiments, a client 202 may communicate with a server 204 via one or more appliances 208(1)-208(*n*) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), interne protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
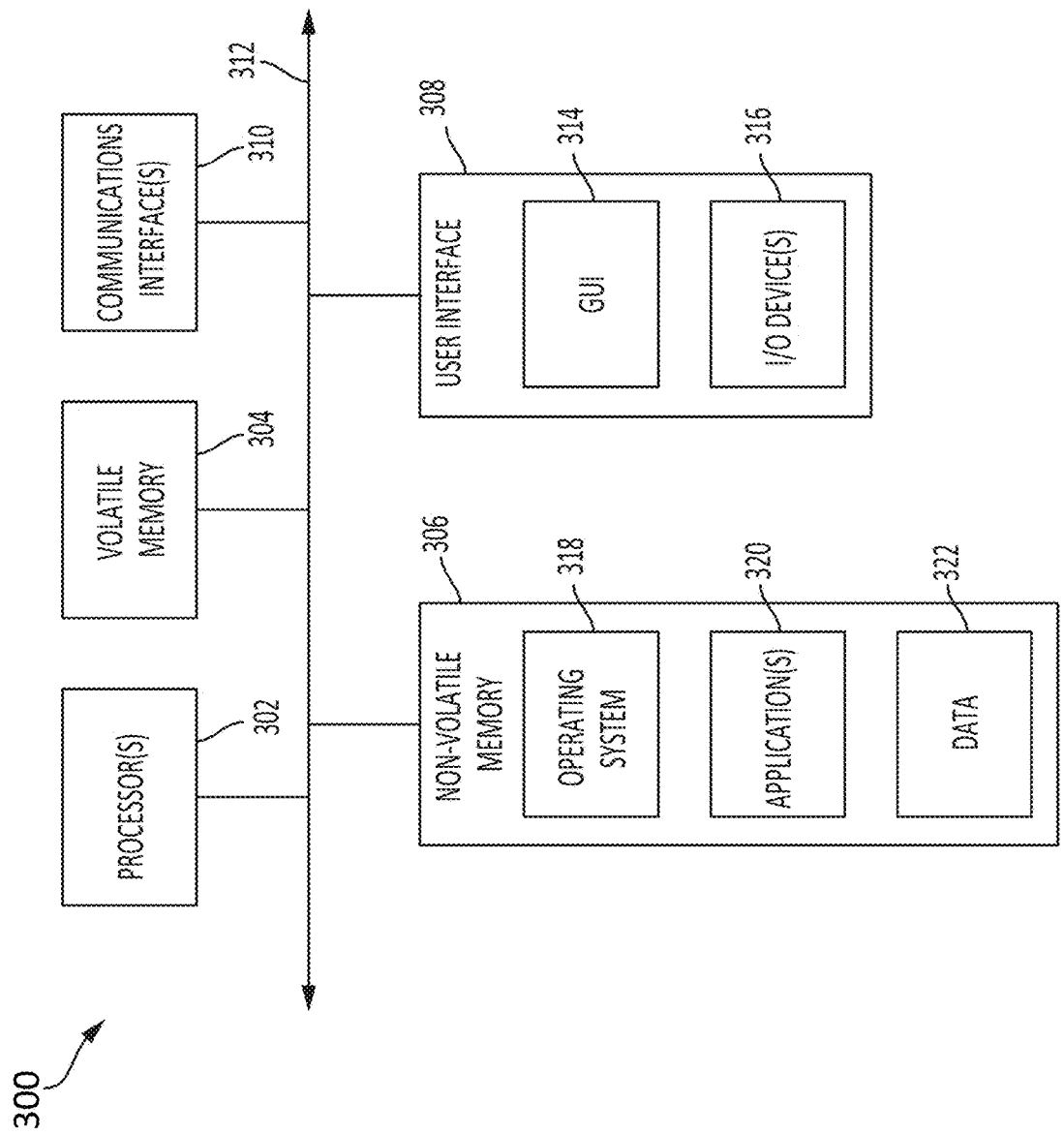
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs)

such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
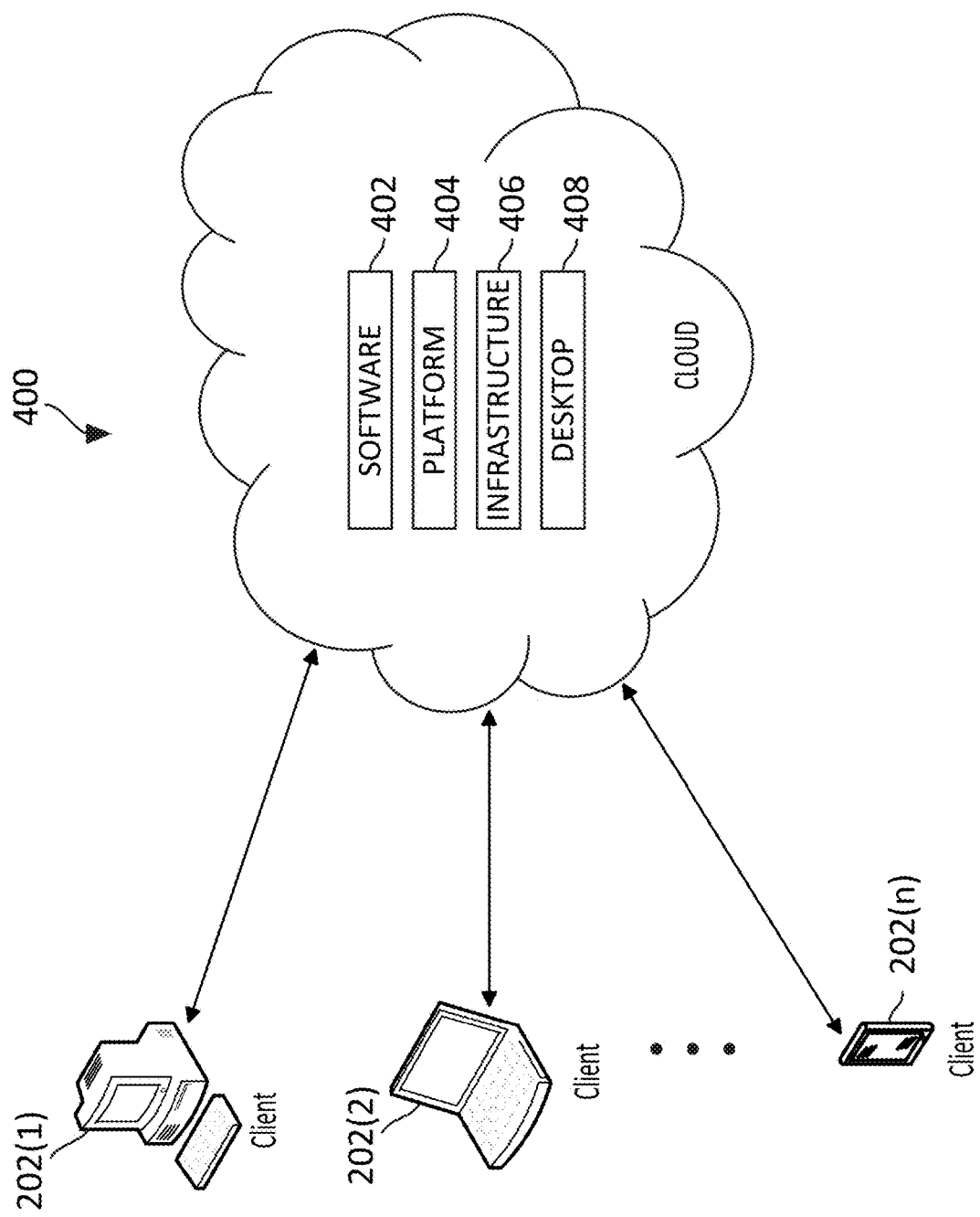
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Washington, Azure IaaS provided by Microsoft Corporation or Redmond, Washington, RACKSPACE CLOUD provided by Rackspace US, Inc., of San Antonio, Texas, Google Compute Engine provided by Google Inc. of Mountain View, California, and RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile® from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

Figure 5A:
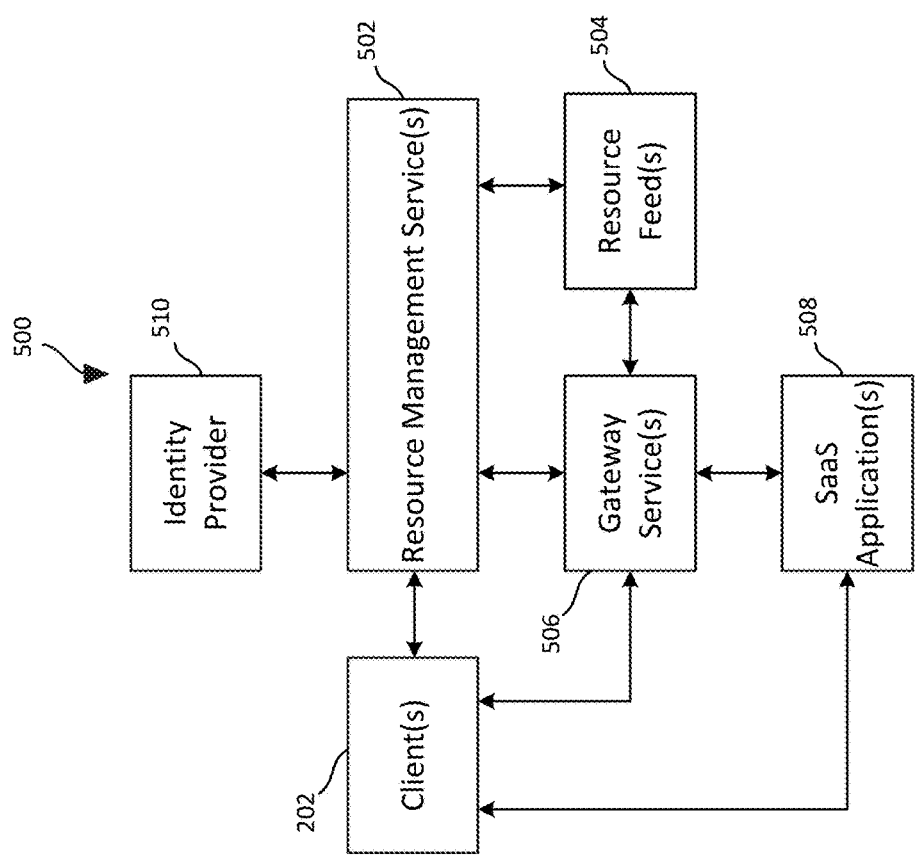
FIG. 5A is a block diagram of an example system in which resource management services may manage and streamline access by clients to resource feeds (via one or more gateway services) and/or software-as-a-service (SaaS) applications.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
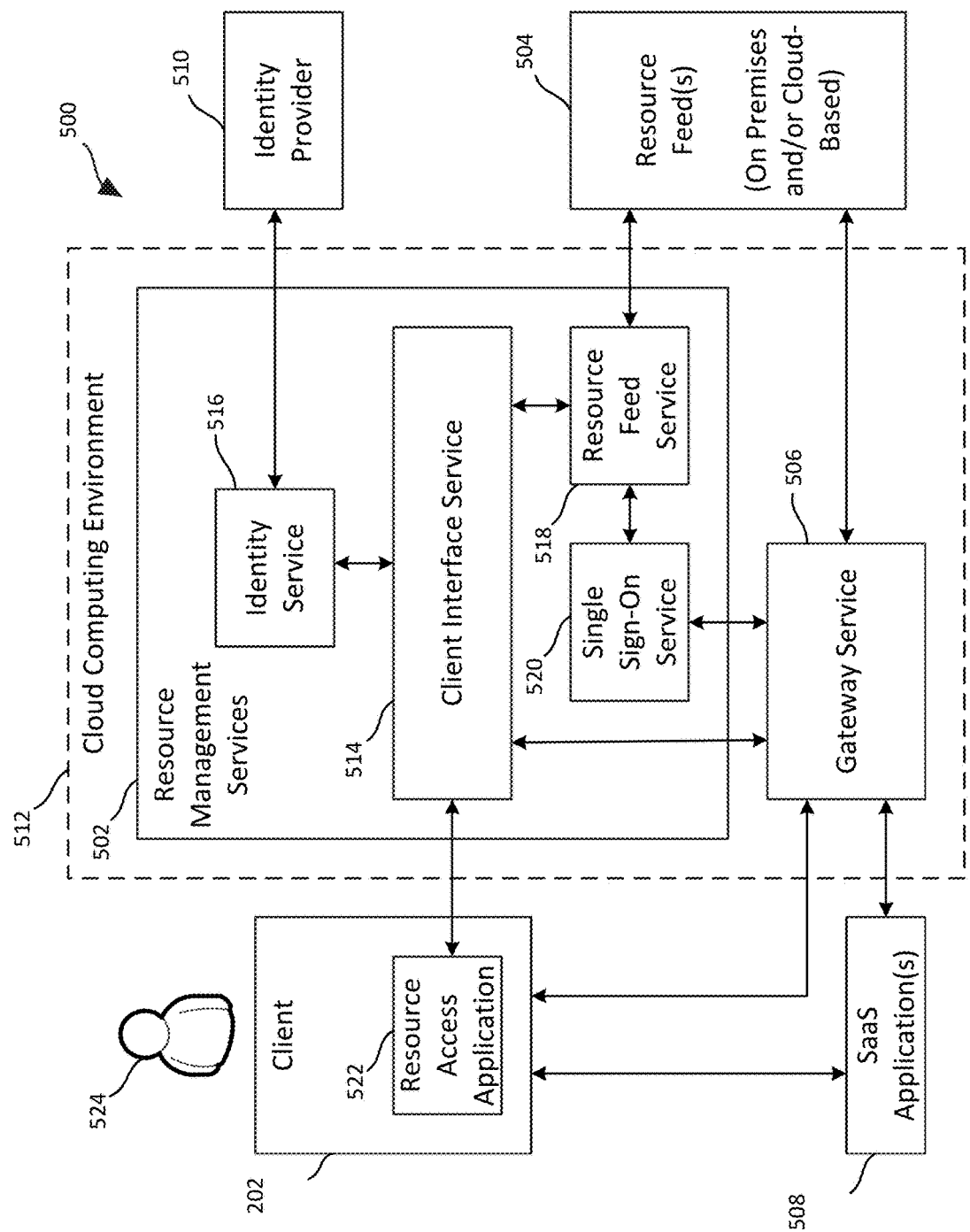
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., ShareFile®), one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well as a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
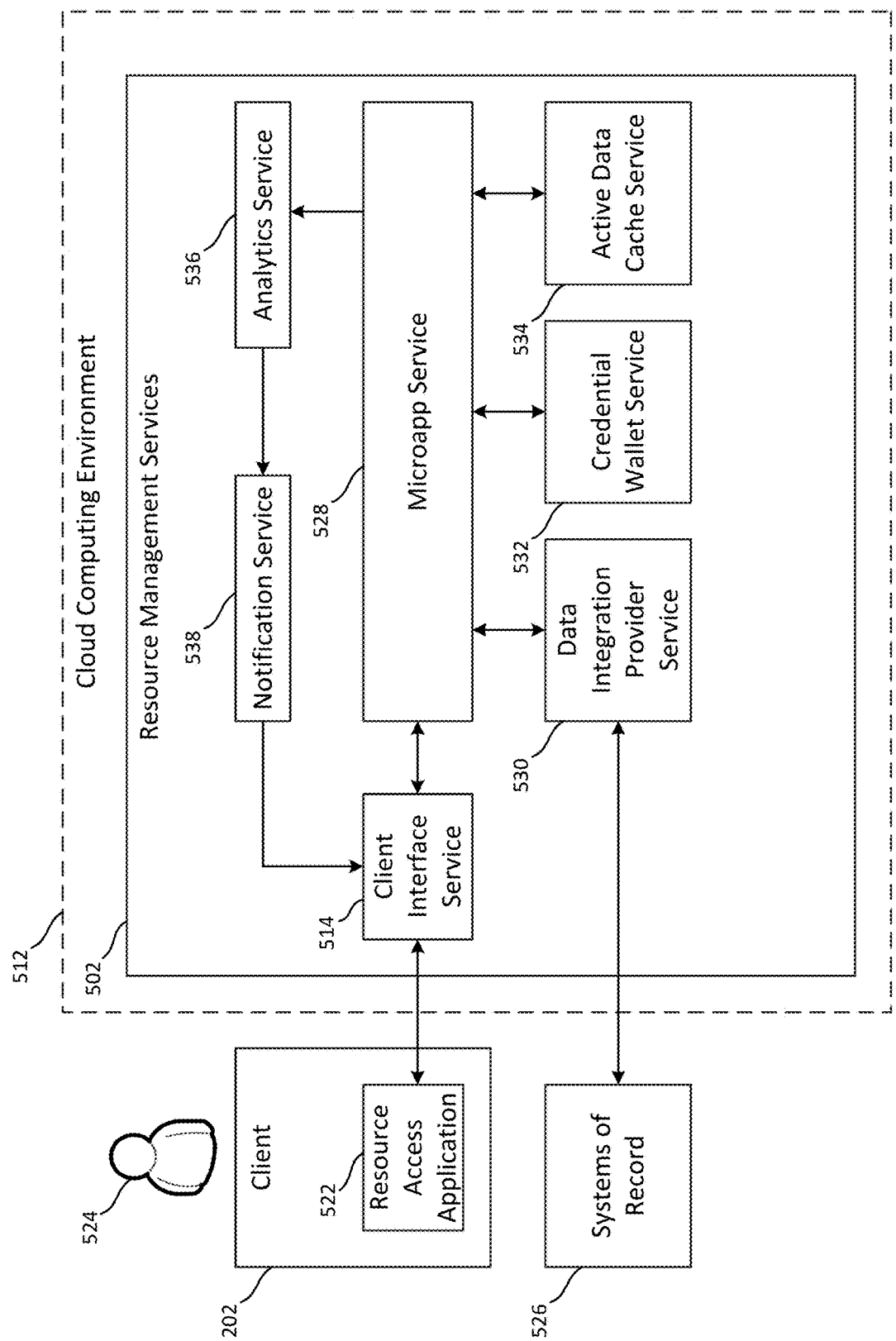
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
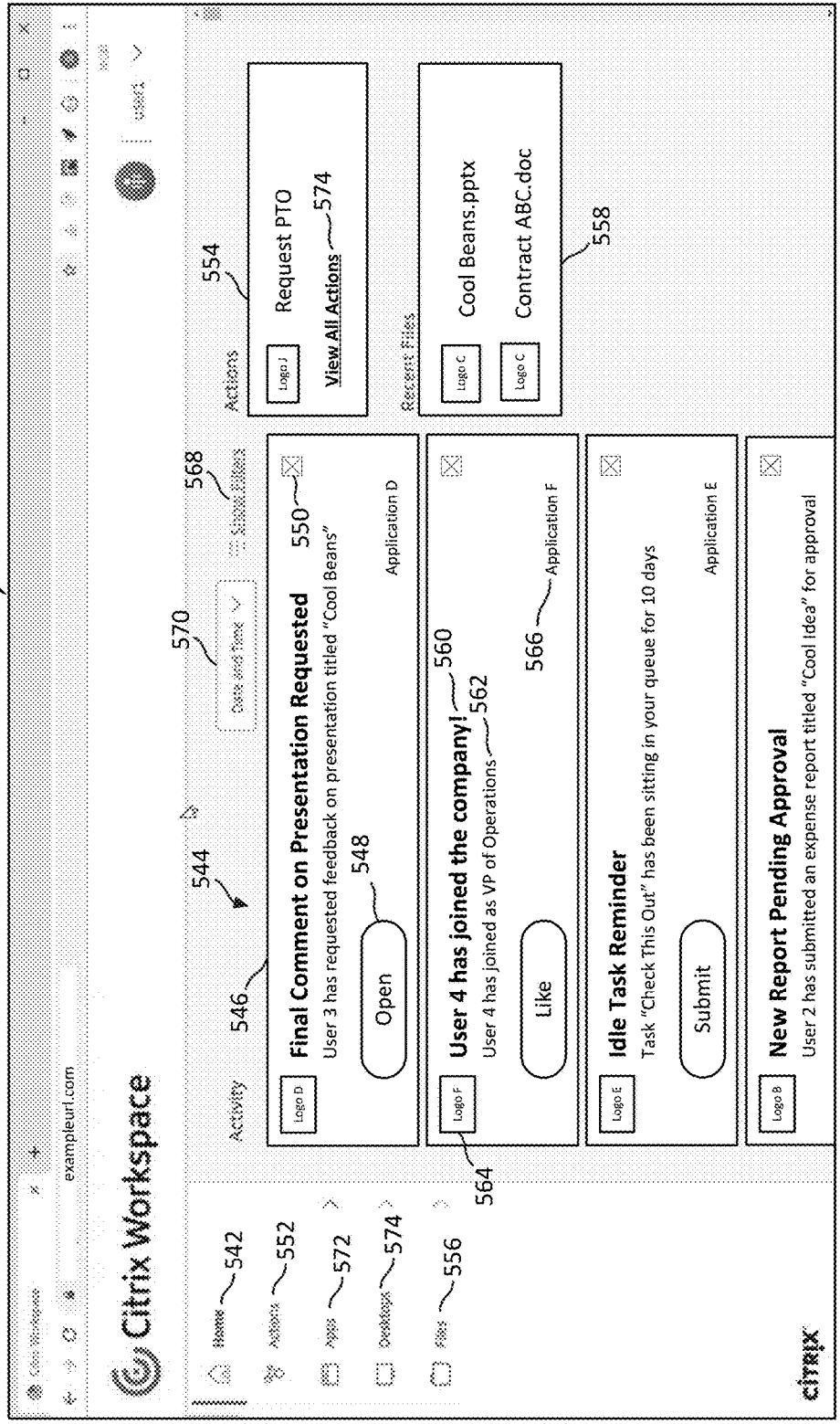
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system of record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp.

In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of available microapp actions. In some implementations, the various microapp actions available to the user 524 logged onto the multi-resource access system 500 may be enumerated to the resource access application 522, e.g., when the user 524 initially accesses the system 500, and the list 554 may include a subset of those available microapp actions. The available microapp actions may, for example, be organized alphabetically based on the names assigned to the actions, and the list 554 may simply include the first several (e.g., the first four) microapp actions in the alphabetical order. In other implementations, the list 554 may alternatively include a subset of the available microapp actions that were most recently or most commonly accessed by the user 524, or that are preassigned by a system administrator or based on some other criteria. The user 524 may also access a complete set of available microapp actions, in a similar manner as the "action" user interface element 552, by clicking on the "view all actions" user interface element 574.

As shown, additional resources may also be accessed through the screen 540 by clicking on or otherwise selecting one or more other user interface elements that may be presented on the screen. For example, in some embodiments, the user may also access files (e.g., via a Citrix ShareFile® platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

Figure 6:
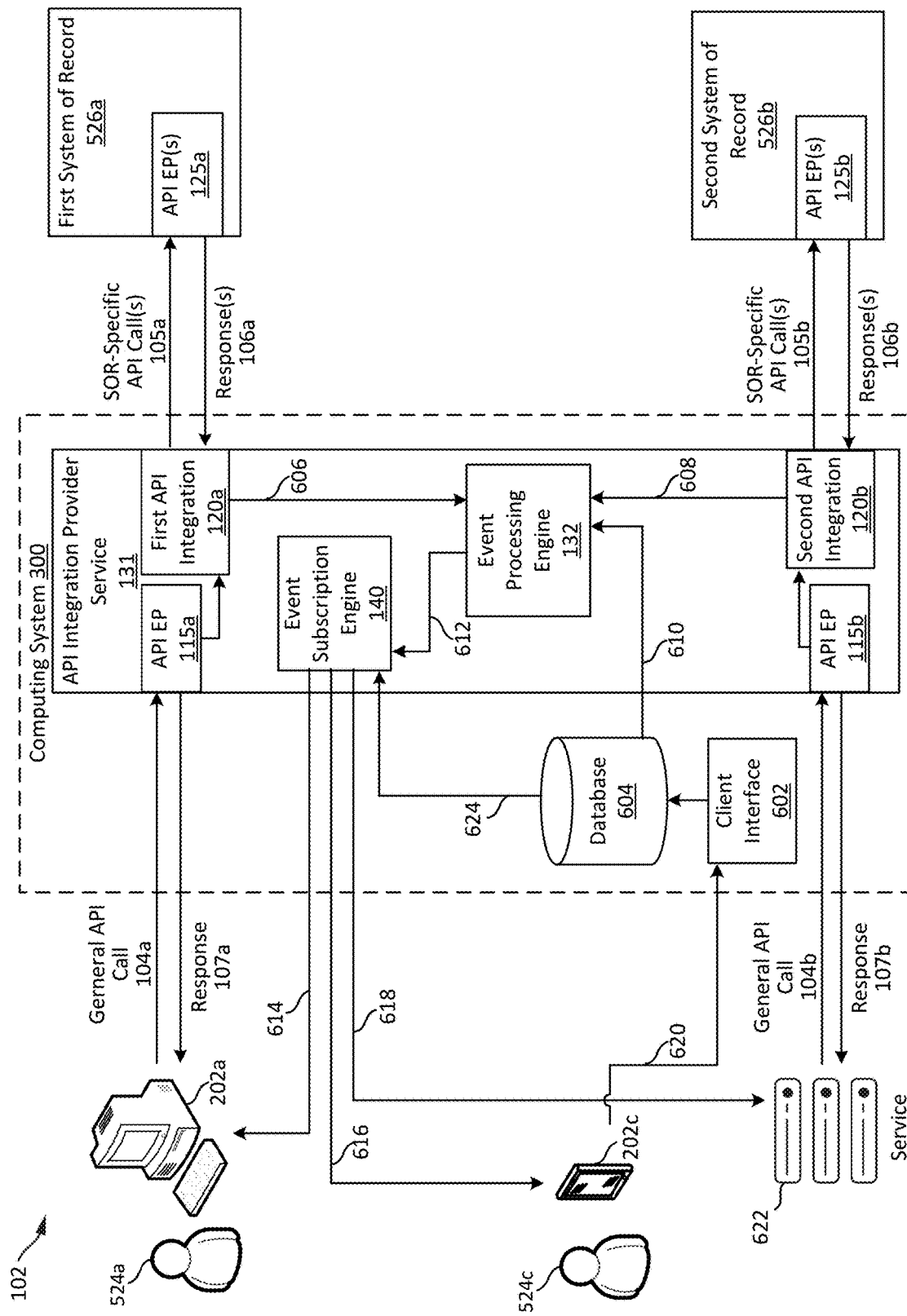
FIG. 6 is a block diagram illustrating possible components of an example system for exposing standardized events within an API proxy system, in accordance with some embodiments.

F. Detailed Description of Example Embodiments of the System Introduced in Section A FIG. 6 is a block diagram illustrating possible components of the example system 102 that was introduced in Section A. As Section A describes, in some implementations, the system 102 may include an API integration provider service 131 that has been enhanced with an event processing engine 132 to identify events being processed by one or more API integration components (e.g., the first API integration 120*a* and the second API integration 120*b*). As also described in Section A, in some implementations, the API integration provider service 131 may be further enhanced with an event subscription engine 140 to generate event indications 118 based on event data received from the event processing engine 132. In some implementations, the event indications 118 generated by the event subscription engine 140 may be sent to the notification service 538 (shown in FIG. 5C) and may be included among the other notifications 546 that are presented within the activity feed 544 (shown in FIG. 5D) for a client 202.

As illustrated in FIG. 6, in some implementations, the system 102 may further include a client interface 602 for receiving input from a user 524 for event subscriptions, as well as a database 604 to store data indicative of such event subscriptions. In the illustrated example, the event processing engine 132, the event subscription engine 140, the client interface 602, and the database 604 are parts of the same computing system (i.e., a computing system 300—shown in FIG. 3). However, in other implementations, these components may instead be located on one or more different computing systems connected by one or more networks, (e.g., one or more network(s) 206, as described in Section B).

Referring to FIG. 6, a user 524 may desire to receive event notifications 114 for different types of interactions with one or more SORs 526. In some implementations, a user 524 may create an event subscription (e.g., by interacting with the client interface 602) to receive notifications for certain events. As further described in reference to FIG. 7, a user 524 may provide input for various parameters to create the desired event notification subscription. As shown in FIG. 6, a user 524c of a client 202c (as well as a user 524a of a client 202a and/or an operator of a service 622) may access the client interface 602, such as via web page or the resource access application 522, as indicated by an arrow 620. Further details concerning an example client interface 602 are provided below in reference to FIG. 7. In some implementations, the event subscriptions created via the client interface 602 may be stored in the database 604. In some implementations, the event processing engine 132 may retrieve event subscription data from the database 604 to determine which events to report to the event subscription engine 140. In some implementations, the event subscription engine 140 may retrieve user data (such as profile or contact data) from the database 604 to determine where to send event indications 118 (e.g., notifications 114) generated from the event data received from the event processing engine 132.

As described in Section A, an API integration provider service 131 may host API integrations for providing a client 202a or a service 622 (e.g., the microapp service 528 shown in FIG. 5C) with access to particular functionalities or data from SORs 526. In the illustrated example, both the client 202a and the service 622 are configured to access the API integration provider service 131. The API integration provider service 131 may thus provide the client 202 and the service 622 with seamless access to various functionalities or data of one or more systems of record 526a, 526b.

As shown in FIG. 6, an application of the client 202a (e.g., the resource access application 522 shown in FIGS. 5B and 5C) may send one or more general API calls 104a to the API integration provider service 131 (e.g., to the first integration API EP 115a). For example, and without limitation, the resource access application 522 may send general API calls 104a representing a request, such as a search query or file command (e.g., create, delete, update, etc.). The API integration provider service 131 may receive such general API call(s) 104 and, based on an indication therein, may determine an API integration 120a to invoke to, among other things, send one or more requests (e.g., to SOR API EP(s) 125a) to the appropriate system of record 526a.

In some implementations, when the request represented by the general API call 104a is received by the first API integration 120a (via the first integration API EP 115a), the first API integration 120a may send, as indicated by an arrow 606, API data 134, corresponding to the request, to the event processing engine 132. As noted above, the event processing engine 132 may receive API data 134 from one or more API integrations 120 of the API integration provider service 131.

As described in reference to FIG. 1A, the first API integration 120a may make one or more SOR-specific API calls 105a, based on the received request, to the first system of record 526a (e.g., to SOR API EP(s) 125a) on behalf of the client 202a. In some implementations, the first SOR 526a, upon processing the request, may send one or more responses 106a to the SOR-specific API call(s) 105a. The first API integration 120a may receive and process the response(s) 106a from the first system of record 526a, and may send a response 107a to the client 202a via the first integration API EP 115a that received the general API call 104a from the client 202a.

In some implementations, when the response(s) 106a is/are received by the first API integration 120a, the first API integration 120a may send, as indicated by an arrow 606, API data corresponding to the response(s) 106a to the event processing engine 132. In some implementations, the event processing engine 132 may thus receive API data 134 from the first API integration 120a, the API data 134 corresponding to at least one of a request represented by the general API call 104a or the response(s) 106a. In some implementations, the event processing engine 132 may use parameters of the API data 134, such as, but not limited to, the event type, the system of record, and/or keywords, to determine whether to generate event data 136. In some implementations, the event processing engine 132 may determine to generate event data 136 based on subscription data received from the database 604.

In some implementations, the event processing engine 132, upon determining to generate event data 136, may send such event data 136 to the event subscription engine 140, as indicated by an arrow 612. In some implementations, the event data 136 may include notification contact information and/or user profile data that may be used by the event subscription engine 140 to generate and send an event indicator 118, such as an event notification. In some implementations, the event subscription engine 140 may receive such notification contact information and/or user profile data from the database 604, as indicated by an arrow 624. In some implementations, the event subscription engine 140 may generate and send an event indicator 118 to the service 622, such as an event logging system or an analytics dashboard. In some implementations, the event subscription engine 140 may format the event indicator 118 based on the formatting preferences of the service 622.

The event subscription engine 140 may then send event indications 118 to the recipient(s) indicated in the contact information, as indicated by arrows 614 and 616. In some implementations, the event indication 118, as indicted by the arrow 614, may be sent to the same client 202a and user 524a that initiated the request represented by the general API call 104a. In other implementations, the event indication 118, as indicated by the arrow 616, may additionally or alternatively be sent to the client 202c and user 524c other than the client 202a/user 524a that initiated the request represented by the general API call 104a. For example, the user 524c may have created an event subscription using the client interface 602, as indicated by the arrow 620. Specifically, in the example, the user 524c may have created an event subscription to be notified whenever a request is made to delete a file from the first SOR 526a. Further, as noted above, in some implementations, rather than the event subscription engine 140 sending event indications 118 directly to one or more clients 202 and/or services 622, the event subscription engine 140 may instead send event indications 118 to a notification delivery service, such as the notification service 538 shown in FIG. 5C, and may rely on such a notification delivery service to deliver such event notifications to the appropriate client(s) 202 and/or service (s) 622.

Similar to user 524a and client 202a, the service 622 (e.g., the microapp service 528 shown in FIG. 5C), which may be part of the multi-resource access system 500 described in Section E, may send one or more general API calls 104b to the API integration provider service 131 (e.g., to a second integration API EP 115b). For example, and without limitation, the service 622 may send general API calls 104b representing a request, such as a search query or file command (e.g., create, delete, update, etc.). The API integration provider service 131 may receive such API call(s) and, based on an indication therein, may determine an API integration 120b to invoke to, among other things, send one or more requests (e.g., to SOR API EP(s) 125b) to the appropriate system of record 526b.

In some implementations, when the request represented by the general API call 104b is received by the second API integration 120b (via the second integration API EP 115b), the second API integration 120b may send, as indicated by an arrow 608, API data 134, corresponding to the request, to the event processing engine 132. Similar to the previous description in reference to the request and response corresponding to the client 202a and SOR 526a, the second API integration 120b may make one or more SOR-specific API calls 105b, based on the received request, to the second system of record 526b (e.g., to SOR API EP(s) 125b) on behalf of the service 622. In some implementations, the second system of record 526b, upon processing the request, may send one or more responses 106b to the SOR-specific API call(s) 105b. The second API integration 120b may receive and process the response(s) 106b from the second system of record 526b, and may send a response 107b to the service 622 via the second integration API EP 115b that received the general API call 104b from the service 622.

In some implementations, when the response(s) 106b is/are received by the second API integration 120b, the second API integration 120b may send, as indicated by an arrow 608, API data 134, corresponding to the response(s) 106b, to the event processing engine 132. The event processing engine 132 may determine, using the API data 134 received, as indicated by the arrow 608, from the second API integration 120b and event subscription data received, as indicated by the arrow 610, from the database 604, to generate event data 136. In some implementations, the event processing engine 132, may send the event data 136 to the event subscription engine 140, as indicated by the arrow 612. In some implementations, the event subscription engine 140 may send, as indicated by an arrow 618, an event indication 118 to the service 622.

In some implementations, the service 622 may not itself make general API calls 104 to (or receive responses 107 from) the API integration provider service 131, and may instead simply subscribe to be notified of events that are detected by the event processing engine 132. For instance, in some implementations, the service 622 may be used to accumulate telemetry data concerning usage (e.g., tracking the quantity of various types of API calls/responses being processed) of the API integration provider service 131

Figure 7:
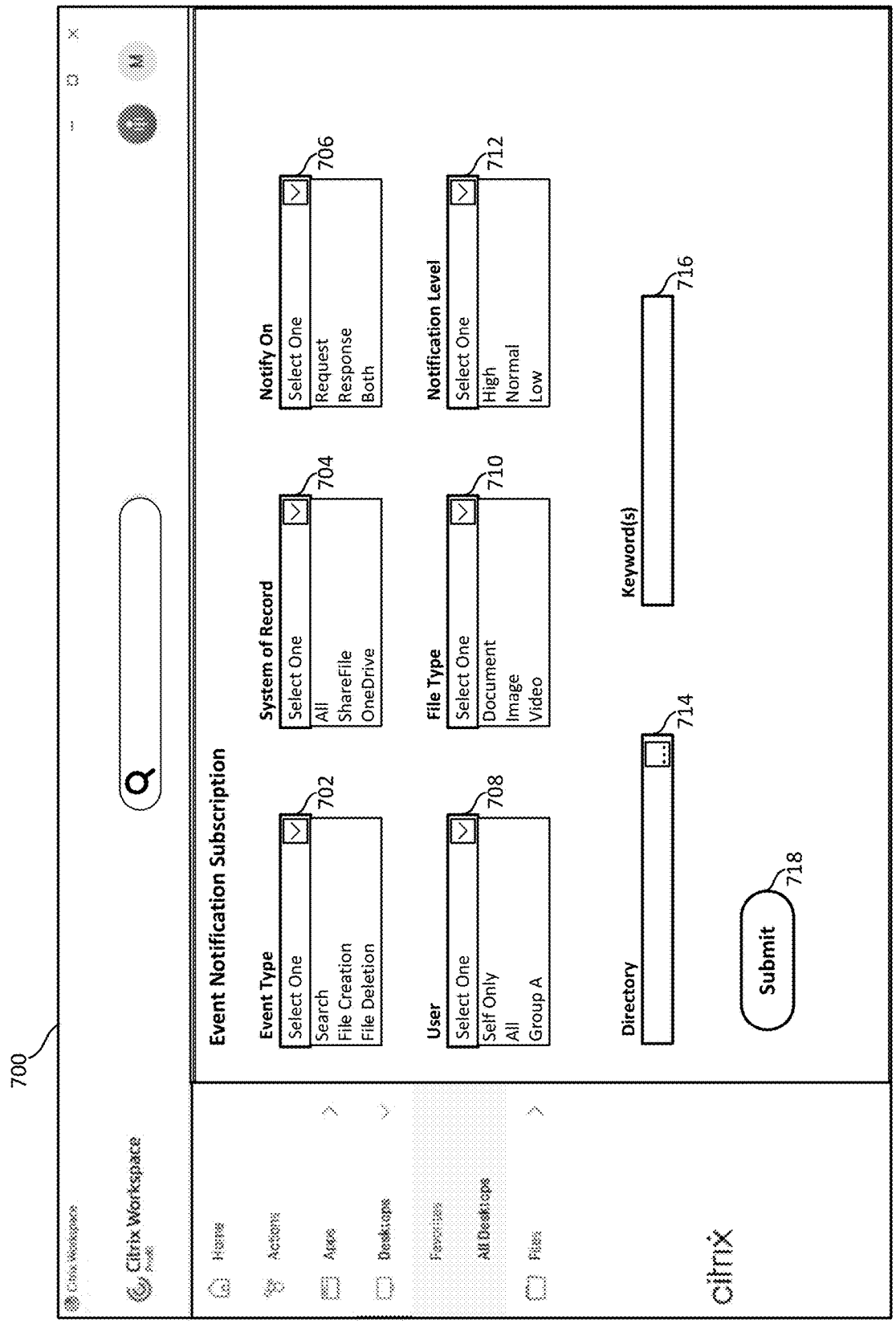
FIG. 7 illustrates an example subscription interface for creating an event subscription, in accordance with some embodiments.

FIG. 7 illustrates an example subscription interface 700 for creating an event subscription, in accordance with some embodiments. In some implementations, for example, the subscription interface 700 may be presented by a display screen of a client device 202. While the subscription interface 700 is illustrated as part of a display content presented by the resource access application 522, the subscription interface may take on any numerous other forms, and may, for example, be a part of display content presented by another software application, a web page, etc. As shown in FIG. 7, in some embodiments, the subscription interface 700 may include elements for creating a subscription. The illustrated elements are merely examples of elements that can be used, and some, all, or none of these elements may be found in other embodiments.

As shown, in some implementations, the subscription interface 700 may include an event type element 702. A user 524 may select the type of event (e.g., "search", "file creation", "file deletion", etc.) for the event subscription using the event type element 702.

In some implementations, the subscription interface 700 may include a system of record element 704. The user 524 may select the system of record (e.g., "ShareFile", "OneDrive", etc.) for the event subscription using the system of record element 704. As shown, in some implementations, the system of record element 704 may include an "All" (or similar) option for an event subscription that may apply to any system of record 526. For example, an event subscription may be created for any file deletion, regardless of the system of record 526, by selecting the "File Deletion" option from the event type element 702 and the "All" option from the system of record element 704.

In some implementations, the subscription interface 700 may include a "notify on" element 706. The user 524 may select, using the "notify on" element 706, whether to receive an event notification when a SOR 526 request is received, when a response (e.g., the response 106) is received from the SOR 526, or both.

In some implementations, the subscription interface 700 may include a user element 708. The user 524 may identify, using the user element 708, one or more users whose activity is to be monitored for events. For example, the event subscription may indicate that event notifications 114 are to be sent to the user 524 for detected events corresponding to general API calls 104 made by (A) only the user 524, (B) another user, or (C) a select group of users (e.g., "Group A"), which may or may not include the user 524.

In some implementations, the subscription interface 700 may include a file type element 710. The user 524 may select a type of file (e.g., "Document", "Image", "Video", etc.) for the event subscription.

In some implementations, the subscription interface 700 may include a notification level element 712. The user 524 may select, using the notification level element 712, a notification level (e.g., "High," "Normal," "Low") for event notifications 114 that are generated based on the subscription. For example, as described in reference to event notification 114b, the notification level for the event subscription used to generate the event notification 114b may be "High" to alert the user of an unauthorized access of a file.

In some implementations, the subscription interface 700 may include a directory element 714. The user 524 may use the directory element 714 to identify a file system or computer file directory to monitor for an event type, as may be selected using the event type element 702.

In some implementations, the subscription interface 700 may include a keyword(s) element 716. The user 524 may enter keywords at the keyword(s) element 716 for the event subscription to monitor. For example, using the previously reference event notification 114b, the event subscription for event notification 114b may have included "payroll" as a keyword, which keyword may have been entered via the keyword(s) element 716.

In some implementations, the subscription interface 700 may include a submit element 718. When the user 524 has completed selecting the parameters for the event subscription using the example illustrated elements 702, 704, 706, 708, 710, 712, 714, 716, the user 524 may click the submit element 718 to submit the parameters for the event subscription. The event subscription parameters then may be stored, such as in the database 604.

Figure 8:
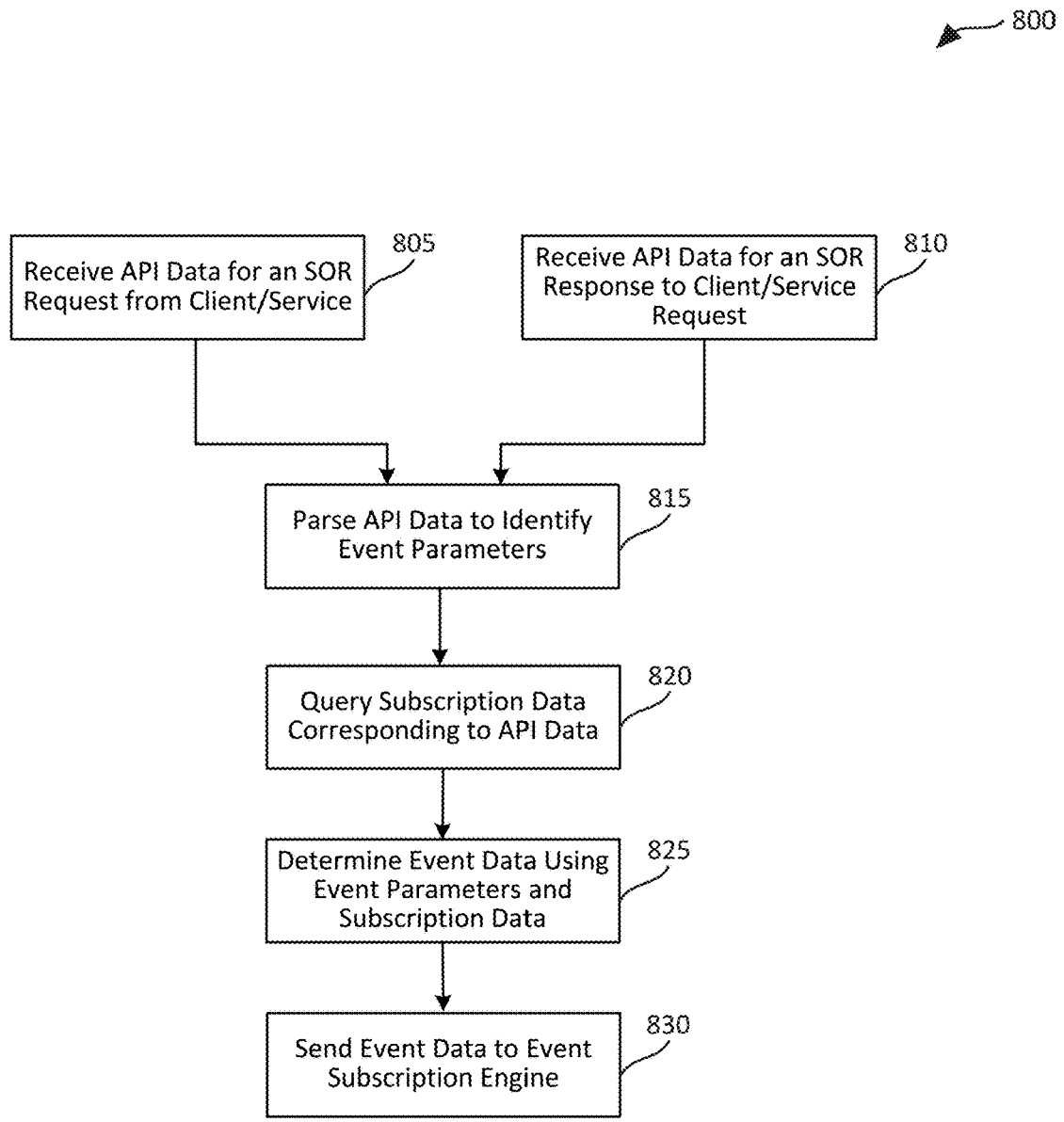
FIG. 8 illustrates an example routine that may be performed by the event processing engine shown in FIG. 6, in accordance with some embodiments.

FIG. 8 illustrates an example routine 800 that may be performed by the event processing engine 132 for collecting API data 134 and determining event data 136, in accordance with some embodiments. In some implementations, the event processing engine 132 may be a part of the API integration provider service 131. In some implementations, the event subscription engine 140 may be incorporated with the event processing engine 132. In some implementations, the event subscription engine 140 may be a separate component from the event processing engine 132 and may execute on the same computing system 300 as event processing engine 132 or one or more separate computing systems connected by one or more networks.

As shown in FIG. 8, in some implementations, the routine 800 may begin by receiving API data 134. In some implementations, the routine 800 may begin at a step 805, at which the event processing engine 132 may receive API data 134 for an SOR request from a client 202 (e.g., the general API call 104a) or a service 622 (e.g., the general API call 104b). In some implementations, the routine 800 may begin at a step 810, at which the event processing engine 132 may receive API data 134 for an SOR response (e.g., a response 106) to the SOR request received from the client 202/service 622.

In some implementation, based on receiving API data 134, at a step 815 of the routine 800, the event processing engine 132 may parse the API data 134 to identify event parameters. For example, the event processing engine 132 may parse the API data 134 to identify one or more event parameters which correspond to event subscription parameters, such as those described in reference to FIG. 7 (e.g., user type, system of record, etc.). In some implementations, at the step 815, the event processing engine 132 may identify keywords in the API data 134, such as terms provided in a search query request or terms from a document title.

In some implementations, at a step 820, the event processing engine 132 may perform a query of event subscription data, such as event subscription data stored in the database 604, using the event parameters. The event processing engine 132 may identify one or more event subscriptions with event parameter(s), or one or more event criteria, that correspond to the API data 134 received at the step 805 or the step 810.

In some implementations, at a step 825 of the routine 800, the event processing engine 132 may determine event data 136 for one or more event indicators 118 based on the event parameters and the one or more event subscriptions. In some implementations, the event data 136 may include one or more indicators for a type of notification the user 524 prefers, such as in an email or as part of a notification feed 112 (presented by the resource access application 522 or otherwise), as shown in FIG. 1B. Based on such notification type preference, the event data 136 may include user identification or contact information for delivering the event notification(s) 114, such as an email address or a user profile identifier for the resource access application 522.

In some implementations, at a step 830 of the routine 800, the event processing engine 132 may send the event data 136 to the event subscription engine 140. In some implementations, the event subscription engine 140 may determine a destination for an event indication 118 it generates. In some implementations, the event subscription engine 140 may send the event indication 118 to the service 622, such as an event logging system or analytics dashboard. In some implementations, the event subscription engine 140 may determine the notification type preference and user identification or contact information discussed in reference to the step 825. The event subscription engine 140 may use the event data 136 to construct an event notification 114, such as an email or feed item (e.g., notifications 114a, 114b, 114c). The event subscription engine 140 may send or transmit such an event notification 114 based on the notification type, such as sending an email or transmitting the notification to the client interface service 514 for presentation as part of the notification feed 112 or to the notification service 538 for display as part of the activity feed 544 presented by the resource access application 522, as shown in FIG. 1B.

G. Example Implementations of Methods, Systems, and Computer-Readable Media in Accordance with the Present Disclosure The following paragraphs (M1) through (M8) describe examples of methods that may be implemented in accordance with the present disclosure.

(M1) A method may be performed that involves receiving, at a first application programming interface (API) endpoint of a first computing system, a first request for a first operation; sending, from the first computing system to a second API endpoint, a first API call requesting the first operation; in response to sending the first API call, receiving a first response to the first API call; determining, by the first computing system, that at least one characteristic of the first request or the first response satisfies a criterion; detecting, by the first computing system, a first event based on the first request or the first response satisfying the criterion; and generating, by the first computing system, a first indication of the first event.

(M2) A method may be performed as described in paragraph (M1), and may further involve receiving, at a third API endpoint of the first computing system, a second request for a second operation; sending, from the first computing system to a fourth API endpoint, a second API call requesting the second operation; in response to sending the second API call, receiving a second response to the second API call; determining, by the first computing system, that at least one characteristic of the second request or the second response satisfies the criterion; detecting, by the first computing system, a second event based on the second request or the second response satisfying the criterion; and generating, by the first computing system, a second notification based on the first event.

(M3) A method may be performed as described in any of paragraphs (M1) through (M2), and may further involve sending, from the first computing system to a second computing system, the first indication.

(M4) A method may be performed as described in any of paragraphs (M1) through (M3), wherein generating the first indication may further involve determining that at least one characteristic of the first event satisfies a condition.

(M5) A method may be performed as described in any of paragraphs (M1) through (M4), and may further involve determining a recipient of the first indication based on at least one characteristic of the first event.

(M6) A method may be performed as described in any of paragraphs (M1) through (M5), and may further involve receiving, by the first computing system and from a second computing system, a second request to subscribe to events corresponding to satisfaction of the criterion; and sending, to the second computing system, the first indication based at least in part on the second request.

(M7) A method may be performed as described in paragraph (M6), wherein the first request may be received from a third computing system, and the third computing system may be separate from the second computing system.

(M8) A method may be performed as described in any of paragraphs (M1) through (M7), wherein the criterion may correspond to a first operation type.

The following paragraphs (S1) through (S8) describe examples of systems and devices that may be implemented in accordance with the present disclosure.

(S1) A system may comprise at least one processor and at least one computer-readable medium encoded with instructions which, when executed by the at least one processor, cause the system to receive, at a first application programming interface (API) endpoint, a first request for a first operation, to send, to a second API endpoint, a first API call requesting the first operation; in response to sending the first API call, receive a first response to the first API call, to determine that at least one characteristic of the first request or the first response satisfies a criterion, to detect a first event based on the first request or the first response satisfying the criterion, and to generate a first indication of the first event.

(S2) A system may be configured as described in paragraph (S1), and the at least one computer-readable medium may be further encoded with additional instructions which, when executed by the at least one processor, further cause the system to receive, at a third API endpoint, a second request for a second operation, to send, to a fourth API endpoint, a second API call requesting the second operation; in response to sending the second API call, receive a second response to the second API call, to determine that at least one characteristic of the second request or the second response satisfies the criterion, to detect a second event based on the second request or the second response satisfying the criterion, and to generate a second indication of the first event.

(S3) A system may be configured as described in paragraph (S2), and the at least one computer-readable medium may be further encoded with additional instructions which, when executed by the at least one processor, further cause the system to send, to a second computing system, the first indication.

(S4) A system may be configured as described in any of paragraphs (S1) through (S3), and the at least one computer-readable medium may be further encoded with additional instructions which, when executed by the at least one processor, further cause the system to generate the first indication at least in part by determining that at least one characteristic of the first event satisfies a condition.

(S5) A system may be configured as described in any of paragraphs (S1) through (S4), and the at least one computer-readable medium may be further encoded with additional instructions which, when executed by the at least one processor, further cause the system to determine a recipient of the first indication based on at least one characteristic of the first event.

(S6) A system may be configured as described in any of paragraphs (S1) through (S5), and the at least one computer-readable medium may be further encoded with additional instructions which, when executed by the at least one processor, further cause the system to receive, from a second computing system, a second request to subscribe to events corresponding to satisfaction of the criterion, and to send, to the second computing system, the first indication based at least in part on the second request.

(S7) A system may be configured as described in paragraph (S6), wherein the first request may be received from a third computing system and the third computing system may be separate from the second computing system.

(S8) A system may be configured as described in any of paragraphs (S1) through (S7), wherein the criterion may correspond to a first operation type.

The following paragraphs (CRM1) through (CRM8) describe examples of computer-readable media that may be implemented in accordance with the present disclosure.

(CRM1) At least one non-transitory computer-readable medium may be encoded with instructions which, when executed by at least one processor of a system, cause the system to receive, at a first application programming interface (API) endpoint, a first request for a first operation, to send, to a second API endpoint, a first API call requesting the first operation, in response to sending the first API call, to receive a first response to the first API call, to determine that at least one characteristic of the first request or the first response satisfies a criterion, to detect a first event based on the first request or the first response satisfying the criterion, and to generate a first indication of the first event.

(CRM2) At least one non-transitory computer-readable medium may be configured as described in paragraph (CRM1), and may be further encoded with additional instructions which, when executed by the at least one processor, further cause the system to receive, at a third API endpoint, a second request for a second operation, to send, to a fourth API endpoint, a second API call requesting the second operation, in response to sending the second API call, to receive a second response to the second API call to determine that at least one characteristic of the second request or the second response satisfies the criterion, to detect a second event based on the second request or the second response satisfying the criterion, and to generate a second indication of the first event.

(CRM3) At least one non-transitory computer-readable medium may be configured as described in any of paragraphs (CRM1) through (CRM2), and may be further encoded with additional instructions which, when executed by the at least one processor, further cause the system to send, to a second computing system, the first indication.

(CRM4) At least one non-transitory computer-readable medium may be configured as described in any of paragraphs (CRM1) through (CRM3), and may be further encoded with additional instructions which, when executed by the at least one processor, further cause the system to generate the first indication at least in part by determining that at least one characteristic of the first event satisfies a condition.

(CRM5) At least one non-transitory computer-readable medium may be configured as described in any of paragraphs (CRM1) through (CRM4), and may be further encoded with additional instructions which, when executed by the at least one processor, further cause the system to determine a recipient of the first indication based on at least one characteristic of the first event.

(CRM6) At least one non-transitory computer-readable medium may be configured as described in any of paragraphs (CRM1) through (CRM5), and may be further encoded with additional instructions which, when executed by the at least one processor, further cause the system to receive, from a second computing system, a second request to subscribe to events corresponding to satisfaction of the criterion and to send, to the second computing system, the first indication based at least in part on the second request.

(CRM7) At least one non-transitory computer-readable medium may be configured as described in paragraph (CRM6), wherein the first request may be received from a third computing system and the third computing system may be separate from the second computing system.

(CRM8) At least one non-transitory computer-readable medium may be configured as described in any of paragraphs (CRM1) through (CRM7), wherein the criterion may correspond to a first operation type.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    receiving user input identifying a plurality of parameters for sending indications of events;
    receiving, at a first application programming interface (API) endpoint of a first computing system, a first request for a first operation;
    sending, from the first computing system to a second API endpoint, a first API call requesting the first operation;
    in response to sending the first API call, receiving a first response to the first API call;
    determining, by the first computing system, that at least one characteristic of the first request or the first response satisfies a criterion, wherein the criterion corresponds to the plurality of parameters;
    detecting, by the first computing system, a first event based on the first request or the first response satisfying the criterion;
    generating, by the first computing system, a first indication of the first event;
    receiving, by the first computing system and from a second computing system, a second request to subscribe to events corresponding to satisfaction of the criterion; and
    sending, to the second computing system, the first indication based at least in part on the second request,
    wherein the first request is received from a third computing system, and
    wherein the third computing system is separate from the second computing system.

2. The method of claim 1, further comprising:
    receiving, at a third API endpoint of the first computing system, a third request for a second operation;
    sending, from the first computing system to a fourth API endpoint, a second API call requesting the second operation;
    in response to sending the second API call, receiving a second response to the second API call;
    determining, by the first computing system, that at least one characteristic of the third request or the second response satisfies the criterion;
    detecting, by the first computing system, a second event based on the third request or the second response satisfying the criterion; and
    generating, by the first computing system, a second notification based on the first event.

3. The method of claim 1, further comprising:
    sending, from the first computing system to the second computing system, the first indication.

4. The method of claim 1, wherein generating the first indication further comprises:
    determining that at least one characteristic of the first event satisfies a condition.

5. The method of claim 1, further comprising:
    determining a recipient of the first indication based on at least one characteristic of the first event.

6. The method of claim 1, wherein the criterion corresponds to a first operation type.

7. A first computing system comprising:
    at least one processor; and
    at least one computer-readable medium encoded with instructions which, when executed by the at least one processor, cause the first computing system to:
    receive user input identifying a plurality of parameters for sending indications of events;
    receive, at a first application programming interface (API) endpoint, a first request for a first operation;
    send, to a second API endpoint, a first API call requesting the first operation;
    in response to sending the first API call, receive a first response to the first API call;
    determine that at least one characteristic of the first request or the first response satisfies a criterion, wherein the criterion corresponds to the plurality of parameters;
    detect a first event based on the first request or the first response satisfying the criterion;
    generate a first indication of the first event;
    receive, from a second computing system, a second request to subscribe to events corresponding to satisfaction of the criterion; and
    send, to the second computing system, the first indication based at least in part on the second request,
    wherein the first request is received from a third computing system, and
    wherein the third computing system is separate from the second computing system.

8. The first computing system of claim 7, wherein the at least one computer-readable medium is further encoded with additional instructions which, when executed by the at least one processor, further cause the first computing system to:
- receive, at a third API endpoint, a third request for a second operation;
- send, to a fourth API endpoint, a second API call requesting the second operation;
- in response to sending the second API call, receive a second response to the second API call;
- determine that at least one characteristic of the third request or the second response satisfies the criterion;
- detect a second event based on the third request or the second response satisfying the criterion; and
- generate a second indication of the first event.

9. The first computing system of claim 8, wherein the at least one computer-readable medium is further encoded with additional instructions which, when executed by the at least one processor, further cause the first computing system to:
- send, to the second computing system, the first indication.

10. The first computing system of claim 7, wherein the at least one computer-readable medium is further encoded with additional instructions which, when executed by the at least one processor, further cause the first computing system to generate the first indication at least in part by:
- determining that at least one characteristic of the first event satisfies a condition.

11. The first computing system of claim 7, wherein the at least one computer-readable medium is further encoded with additional instructions which, when executed by the at least one processor, further cause the first computing system to:
- determine a recipient of the first indication based on at least one characteristic of the first event.

12. The first computing system of claim 7, wherein the criterion corresponds to a first operation type.

13. At least one non-transitory computer-readable medium encoded with instructions which, when executed by at least one processor of a first computing system, cause the first computing system to:
- receive user input identifying a plurality of parameters for sending indications of events;
- receive, at a first application programming interface (API) endpoint, a first request for a first operation;
- send, to a second API endpoint, a first API call requesting the first operation;
- in response to sending the first API call, receive a first response to the first API call;
- determine that at least one characteristic of the first request or the first response satisfies a criterion, wherein the criterion corresponds to the plurality of parameters;
- detect a first event based on the first request or the first response satisfying the criterion;
- generate a first indication of the first event;
- receive, from a second computing system, a second request to subscribe to events corresponding to satisfaction of the criterion; and
- send, to the second computing system, the first indication based at least in part on the second request,
- wherein the first request is received from a third computing system, and
- wherein the third computing system is separate from the second computing system.

14. The at least one non-transitory computer-readable medium of claim 13, further encoded with additional instructions which, when executed by the at least one processor, further cause the first computing system to:
- receive, at a third API endpoint, a third request for a second operation;
- send, to a fourth API endpoint, a second API call requesting the second operation;
- in response to sending the second API call, receive a second response to the second API call;
- determine that at least one characteristic of the third request or the second response satisfies the criterion;
- detect a second event based on the third request or the second response satisfying the criterion; and
- generate a second indication of the first event.

15. The at least one non-transitory computer-readable medium of claim 13, further encoded with additional instructions which, when executed by the at least one processor, further cause the first computing system to:
- send, to the second computing system, the first indication.

* * * * *